(12) United States Patent
Katsuyama et al.

(10) Patent No.: US 11,738,760 B2
(45) Date of Patent: Aug. 29, 2023

(54) VEHICLE CONTROL APPARATUS

(71) Applicant: TOYOTA JIDOSHA KABUSHIKI KAISHA, Toyota (JP)

(72) Inventors: Etsuo Katsuyama, Susono (JP); Manabu Nagasaka, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/719,871

(22) Filed: Apr. 13, 2022

(65) Prior Publication Data

US 2022/0332329 A1 Oct. 20, 2022

(30) Foreign Application Priority Data

Apr. 20, 2021 (JP) .................................. 2021-070911

(51) Int. Cl.
*B60W 40/13* (2012.01)
*B60W 40/10* (2012.01)
*B60W 30/02* (2012.01)

(52) U.S. Cl.
CPC ............ *B60W 40/13* (2013.01); *B60W 30/02* (2013.01); *B60W 40/10* (2013.01); *B60W 2040/1315* (2013.01); *B60W 2530/20* (2013.01); *B60W 2540/215* (2020.02)

(58) Field of Classification Search
CPC .......... B60W 40/13; B60W 2540/215; B60W 30/02; B60W 40/10; B60W 2040/1315; B60W 2530/20
See application file for complete search history.

(56) References Cited

U.S. PATENT DOCUMENTS

| | | | |
|---|---|---|---|
| 2011/0218706 A1* | 9/2011 | Mori ................... | B60W 30/025 701/36 |
| 2013/0218388 A1 | 8/2013 | Katsuyama | |
| 2021/0276539 A1* | 9/2021 | Tan ....................... | B60W 40/10 |
| 2022/0024464 A1 | 1/2022 | Katsuyama | |

FOREIGN PATENT DOCUMENTS

| | | | |
|---|---|---|---|
| JP | 2012-086712 A | | 5/2012 |
| JP | 2019-182104 A | | 10/2019 |
| JP | 2022-021715 A | | 2/2022 |
| KR | 20230035388 A | * | 8/2020 |

* cited by examiner

*Primary Examiner* — Hunter B Lonsberry
*Assistant Examiner* — Jay Khandpur
(74) *Attorney, Agent, or Firm* — Dinsmore & Shohl LLP

(57) ABSTRACT

A vehicle control apparatus configured to calculate a center of gravity six-component; calculate a tire three-component of each wheel for two or more wheels of a vehicle imposing a constraint on each wheel expressed as an inequality corresponding to upper and lower limits of the tire three-component; apply the constraint based on whether the constraint is valid or invalid for each of the wheels based on a predetermined optimum-condition for obtaining an optimum-solution under the constraint, and calculating an optimum-solution of the tire three-component of each wheel by performing a tentative-optimum-solution-calculation one or more times until the predetermined optimum-condition is satisfied; and store an application-state of the constraint when the optimum-solution satisfying the predetermined optimum-condition is obtained, and calculate the optimum-solution of the tire three-component of each wheel by using a stored value of the application-state of the constraint, in the next calculation of the optimum-solution.

2 Claims, 8 Drawing Sheets

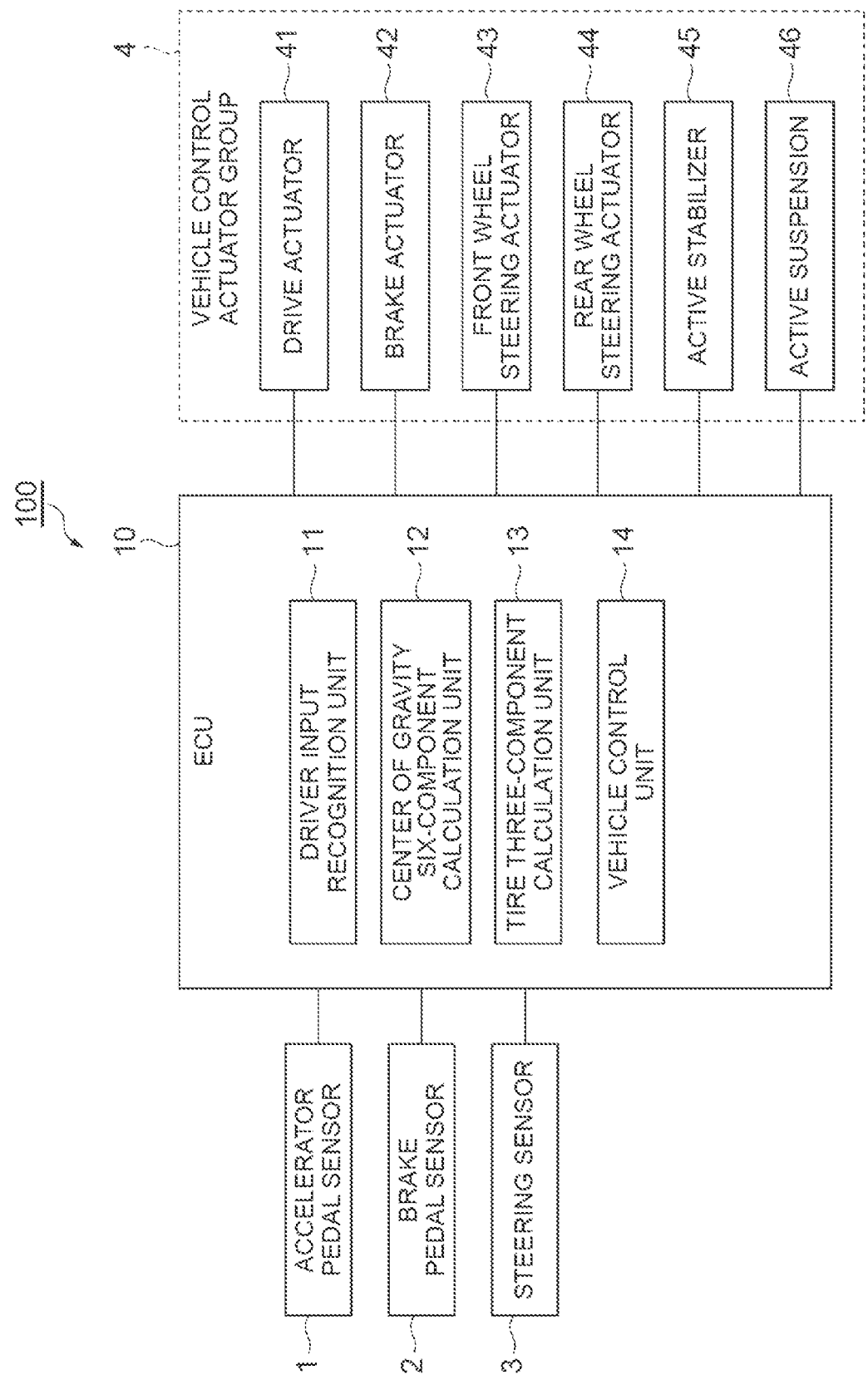

VEHICLE CONTROL APPARATUS

TECHNICAL FIELD

The present disclosure relates to a vehicle control apparatus.

CROSS-REFERENCE TO RELATED APPLICATION

This application claims the benefit of priority from Japanese Patent Application No. 2021-070911, filed on Apr. 20, 2021, the entire contents of which are incorporated herein by reference.

BACKGROUND

In the related art, there has been proposed a vehicle control apparatus in which a control required value of a longitudinal force and a lateral force of a tire generated in each wheel is calculated based on a target value of a center of gravity six-component consisting of a longitudinal force, a lateral force, a vertical force, a roll moment, a pitch moment, and a yaw moment acting on a vehicle, and a vehicle control actuator group is driven. For example, in a vehicle control apparatus disclosed in Japanese Unexamined Patent Publication No. 2019-182104, a tire acting force of each wheel is calculated so that an evaluation function obtained by adding the sum of squares of the error from a target value of a center of gravity six-component and the sum of squares of the error from a target value of the tire acting force of each wheel is minimized based on a coefficient matrix representing a relationship between the center of gravity six-component and the tire acting force of each wheel, and a vehicle control actuator is driven.

Incidentally, depending on the characteristics of the vehicle control actuator group, the characteristics of the tires, and the like, the magnitude of the longitudinal force, the lateral force, or the vertical force of each wheel may be limited to a predetermined range. In order to obtain an optimum control required value based on a predetermined evaluation function in consideration of such limitations, there is a method of obtaining an optimum solution of the longitudinal force, the lateral force, or the vertical force of each wheel based on a predetermined evaluation function after imposing constraints expressed by an inequality corresponding to a predetermined range. In order to obtain the optimum solution that minimizes the evaluation function represented by the sum of squares under the constraints of the inequality, for example, an optimization calculation by a quadratic programming method can be applied. In the calculation of the quadratic programming method, a tentative optimum solution is repeatedly calculated until a predetermined optimum condition is satisfied, and an optimum solution under the constraint is obtained. Here, a calculation of the tentative optimum solution is referred to as a tentative optimum solution calculation. Further, repeating the tentative optimum solution calculation twice or more until the optimum solution is obtained is referred to as an iterative calculation, and the number of iterative calculations when the tentative optimum solution calculation is performed twice is set to one. Iterative calculation may occur when the target value of the center of gravity six-component is updated and when the optimum control required value of the tire acting force of each wheel according to the center of gravity six-component under the constraint is calculated. Since an increase in the number of iterative calculations leads to an increase in a calculation load of the vehicle control apparatus, it is desirable to reduce the number of iterative calculations.

SUMMARY

An aspect of the present disclosure is a vehicle control apparatus that performs vehicle control by a vehicle control actuator group based on a driver input or a vehicle motion control request, the vehicle control apparatus including: a center of gravity six-component calculation unit configured to calculate a center of gravity six-component including a plane three-component and a three-component on spring as vehicle motion targets based on the driver input or the vehicle motion control request; a tire three-component calculation unit configured to calculate a tire three-component of each wheel for two or more wheels of a vehicle from the center of gravity six-component by calculation of a quadratic programming method using an active-set method; and a vehicle control unit configured to perform vehicle control by the vehicle control actuator group based on the tire three-component of each wheel. In the active-set method, a constraint expressed as an inequality corresponding to upper and lower limits of the tire three-component according to characteristics of the vehicle control actuator group or characteristics of each wheel is imposed on each wheel. The tire three-component calculation unit is configured to apply the constraint based on a determination result of determining whether the constraint is valid or invalid for each of the wheels based on a predetermined optimum condition for obtaining an optimum solution under the constraint expressed by the inequality, and calculate an optimum solution of the tire three-component of each wheel by performing a tentative optimum solution calculation one or more times until the predetermined optimum condition is satisfied. The tire three-component calculation unit is configured to store an application state of the constraint when the optimum solution satisfying the predetermined optimum condition is obtained, and calculate the optimum solution of the tire three-component of each wheel by using a stored value of the application state of the constraint, in next optimization calculation.

For example, regarding the application state of the constraint in the active-set method, it is conceivable to start the optimization calculation with a state in which all the constraints are invalidated as an initial state. In such a case, every time the center of gravity six-component is updated, and the optimization calculation of the tire three-component according to the center of gravity six-component is performed, iterative calculations for making the constraint valid to satisfy a predetermined optimum condition may occur. With the vehicle control apparatus according to the aspect of the present disclosure, an application state of the constraint when the optimum solution satisfying the predetermined optimum condition is obtained is stored, and the tentative optimum solution calculation is started with the stored value of the application state of the constraint as the initial state of the constraint in the next optimization calculation. That is, in the next optimization calculation, the tentative optimum solution calculation is started in a state in which the constraint valid when the optimum solution is obtained is applied. Thereby, it is possible to reduce the number of iterative calculations that occur when the constraints are valid, as compared with the case in which the calculation is started from the state in which all the constraints are invalidated.

In the aspect of the present disclosure, the tire three-component calculation unit may be configured to: estimate whether or not an application state of the constraint changes in each wheel; and initialize the stored application state of the constraint when it is estimated that the application state changes when the constraint that was valid is invalidated in any of the wheels.

With the vehicle control apparatus according to the aspect of the present disclosure, in the calculation of the tire three-component by the quadratic programming method, it is possible to reduce the number of tentative optimum solution calculations until a predetermined optimum condition is satisfied.

BRIEF DESCRIPTION OF THE DRAWINGS

FIG. 1 is a block diagram showing a vehicle control apparatus according to an embodiment.

DETAILED DESCRIPTION

Figure 2B:
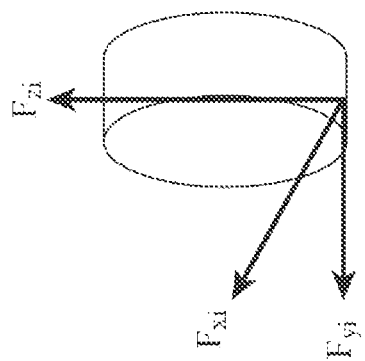
FIG. 2B shows a tire three-component.

Hereinafter, an embodiment of the present disclosure will be described with reference to the drawings.

[Configuration and Function of Vehicle Control Apparatus]

FIG. 1 is a block diagram showing a vehicle control apparatus according to an embodiment. A vehicle control apparatus 100 shown in FIG. 1 is mounted on a vehicle such as a passenger car or a freight car, and executes vehicle control based on a driver input. The vehicle is, for example, a four-wheeled vehicle. Driver input means accelerator operation, brake operation and steering by the driver. The vehicle control is the control of vehicle motion in response to driver input. The vehicle control may be a control that emphasizes a ride comfort or a control that emphasizes an operation response. The characteristics of the vehicle control are not particularly limited.

An example of the configuration of the vehicle control apparatus 100 will be described with reference to the drawings. As shown in FIG. 1, the vehicle control apparatus 100 includes an electronic control unit (ECU) 10 for collectively managing the apparatus. The ECU 10 is an electronic control unit having a central processing unit (CPU), a read only memory (ROM), a random-access memory (RAM), and the like. For example, the ECU 10 loads a program stored in the ROM into the RAM, and executes the program loaded into the RAM by the CPU, thereby realizing various functions. The ECU 10 may include a plurality of electronic control units. The ECU 10 is connected to an accelerator pedal sensor 1, a brake pedal sensor 2, a steering sensor 3, and a vehicle control actuator group 4.

The accelerator pedal sensor 1 is provided for the accelerator pedal of the vehicle and a sensor for detecting an operation amount of the accelerator pedal by the driver. The operation amount of the accelerator pedal means, for example, a depression amount (pedal stroke amount) of the accelerator pedal by the driver.

The brake pedal sensor 2 is provided for the brake pedal of the vehicle, and is a sensor for detecting an operation amount of the brake pedal by the driver. The operation amount of the brake pedal means, for example, a depression amount (pedal stroke amount) of the brake pedal by the driver.

The steering sensor 3 detects an amount of operation of the steering portion of the vehicle by the driver. The steering portion is, for example, a steering wheel and a steering shaft. The steering portion is not limited to a wheel-like configuration, and may be configured to function as a steering wheel. The operation amount of the steering portion means, for example, at least one of a steering angle and a steering torque.

The vehicle control actuator group 4 is an actuator group for executing vehicle control. The vehicle control actuator group 4 in the present embodiment includes a drive actuator 41, a brake actuator 42, a front wheel steering actuator 43, a rear wheel steering actuator 44, an active stabilizer 45, and an active suspension 46.

The drive actuator 41 controls the braking-driving force of the vehicle in accordance with a control command from the ECU 10. As the drive actuator 41, for example, an in-wheel motor built in each of the four wheels may be used. When the vehicle is an electric vehicle, a control command from the ECU 10 is input to a motor to control the braking-driving force. The motor in this case corresponds to the drive actuator 41. The drive actuator 41 may be capable of changing the distribution of the braking-driving force for each wheel of the vehicle. The drive actuator 41 may be capable of changing the distribution of the braking-driving force for the front wheels and the braking-driving force for the rear wheels. The drive actuator 41 may be capable of changing the distribution of the braking-driving force for each of the four wheels. Further, instead of the in-wheel motor, a motor provided to drive two or more wheels by one motor may be used. When the vehicle is a hybrid vehicle, the drive actuator 41 may control the amount of air supplied to the engine (throttle opening degree) in accordance with a control command from the ECU 10 to control the driving force of the vehicle.

The brake actuator 42 controls the brake system in accordance with a control command from the ECU 10, and controls the braking force applied to the tires of the vehicle. As the brake system, for example, a hydraulic brake system can be used. The brake actuator 42 may be capable of changing the distribution of braking force to each wheel of the vehicle. The brake actuator 42 may be capable of changing the distribution of the braking force for the front wheels and the braking force for the rear wheels. The brake actuator 42 may be capable of changing the distribution of braking force for each of the four wheels.

The front wheel steering actuator 43 controls the steering angle of the front wheels of the vehicle in accordance with a control command from the ECU 10. The front wheel steering actuator 43 may be provided on the steering portion of the vehicle as an assist motor that is a part of the electric power steering system. The front wheel steering actuator 43 may be provided, as a steer-by-wire, mechanically independent of the steering portion of the vehicle.

The rear wheel steering actuator 44 controls the steering angle of the rear wheels of the vehicle in accordance with a control command from the ECU 10. The rear wheel steering actuator 44 is provided, for example, as a steer-by-wire, mechanically independent of the steering portion of the vehicle. The rear wheel steering actuator 44 may be an assist motor connected to the steering portion of the vehicle via a torque shaft.

The active stabilizer 45 controls the twist angle of the stabilizer bar in accordance with a control command from the ECU 10. The active stabilizer 45 is provided, for example, on the front and rear of the vehicle.

The active suspension 46 controls suspension characteristics in accordance with a control command from the ECU 10. The active suspension 46 controls the suspension reaction force by adjusting the expansion and contraction by controlling the hydraulic pressure and the air pressure. The active suspension 46 may control the damping force characteristic.

Next, the configuration and function of the ECU 10 will be described. The ECU 10 includes a driver input recognition unit 11, a center of gravity six-component calculation unit 12, a tire three-component calculation unit 13, and a vehicle control unit 14.

The driver input recognition unit 11 recognizes at least one driver input of the accelerator operation, brake operation, and steering by the driver based on the detection results of the accelerator pedal sensor 1, the brake pedal sensor 2, and the steering sensor 3.

The driver input recognition unit 11 calculates a motion command (vehicle state quantity) corresponding to the driver input based on the recognized driver input. The driver input recognition unit 11 obtains, for example, a longitudinal acceleration $A_x$, a front steering angle $\delta_f$, and a rear steering angle $\delta_r$ as motion commands corresponding to the driver input. The method of known can be adopted for the calculation of the motion command from the driver input.

Figure 2A:
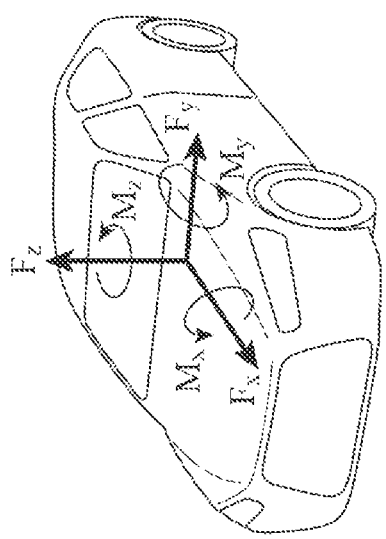
FIG. 2A shows a center of gravity six-component of a vehicle.

The center of gravity six-component calculation unit 12 calculates the center of gravity six-component as the vehicle motion target based on the motion command calculated from the driver input by the driver input recognition unit 11. FIG. 2A shows a center of gravity six-component of a vehicle. As shown in FIG. 2A, the center of gravity six-component of the vehicle is expressed as the longitudinal force $F_x$, the lateral force $F_y$, the vertical force $F_z$, the roll moment $M_x$, the pitch moment $M_y$, and the yaw moment $M_z$.

As an example, the center of gravity six-component calculation unit 12 calculates a plane three-component using a plane motion model, and then calculates a center of gravity six-component by a two-step calculation of calculating a three-component on spring using an inertial motion model taking inertial force and suspension reaction force into consideration. The plane motion model and the inertial motion model may be preset motion models. The center of gravity six-component calculation unit 12 calculates the sideslip angle β, the yaw angular velocity r, and the yaw angular acceleration dr/dt by applying the longitudinal acceleration $A_x$, the front steering angle $\delta_f$, and the rear steering angle $\delta_r$, which are motion commands corresponding to the driver input, to the plane motion model. The plane motion model is reflected, for example, the dynamic characteristics of the vehicle. As an example of the plane motion model, a two-wheel model can be adopted. The plane motion model is not limited to the two-wheel model. Other models corresponding to the two-wheel model may be used.

A center of gravity six-component calculation unit 12 calculates a plane three-component from the sideslip angle β, the yaw angular velocity r, and the yaw angular acceleration dr/dt using a plane motion model. The center of gravity six-component calculation unit 12 calculates the longitudinal force $F_x$, the lateral force $F_y$, and the yaw moment $M_z$ of the center of gravity six-component as a plane three-component. The method of known can be adopted for obtaining the plane three-component based on the sideslip angle β, the yaw angular velocity r, and the yaw angular acceleration dr/dt.

The center of gravity six-component calculation unit 12 calculates a three-component on spring from a plane three-component using an inertial motion model taking inertial force and suspension reaction force into consideration. The inertial motion model is a coupled model (relative motion model between the upper spring and the lower spring) considering inertial force and suspension reaction force. The center of gravity six-component calculation unit 12 calculates the vertical force $F_z$, the roll moment $M_x$, and the pitch moment $M_y$ as three-components on spring. If necessary, the warp moment $M_w$ is also added as a motion control command value. As the inertial motion model, a known model can be used as long as it is a coupled model in which inertial force and suspension reaction force are considered. The center of gravity six-component calculation unit 12 obtains a center of gravity six-component y ($F_x$, $F_y$, $F_z$, $M_x$, $M_y$, $M_z$) by calculating a three-component on spring ($F_z$, $M_x$, $M_y$) from a plane three-component ($F_x$, $F_y$, $M_z$) using an inertial motion model.

The tire three-component calculation unit 13 calculates the tire three-component of the four wheels based on the center of gravity six-component calculated by the center of gravity six-component calculation unit 12. FIG. 2B shows a tire three-component. As shown in FIG. 2B, the tire three-component is expressed as the longitudinal force $F_{xi}$, the lateral force $F_{yi}$, and the vertical force $F_{zi}$ of the tire. Where "i" is a symbol that varies depending on the position of the tire. Specifically, the tire three-component of the right front wheel is expressed as a longitudinal force $F_{xfr}$, a lateral force $F_{yfr}$, and a vertical force $F_{zfr}$. The tire three-component of the left front wheel is expressed as a longitudinal force $F_{xfl}$, a lateral force $F_{yfl}$, and a vertical force $F_{zfl}$. The tire three-component of the right rear wheel is expressed as a longitudinal force $F_{xrr}$, a lateral force $F_{yrr}$, and a vertical force $F_{zrr}$. The tire three-component of the left rear wheel is expressed as a longitudinal force $F_1$, a lateral force $F_{yrl}$, and a vertical force $F_{zrl}$.

The tire three-component calculation unit 13 calculates the tire three-component of the four wheels from the center of gravity six-component based on a coefficient matrix determined by the arrangement of each wheel and the suspension mechanism in the vehicle. The relationship between the center of gravity six-component and the tire three-component of the four wheels can be expressed, for example, as the following equations (1) to (4). "y" is a vector representing the center of gravity six-component, "C" is a coefficient matrix, and "u" is a vector representing the tire three-component of four wheels.

Equation 1

$$y = Cu \qquad (1)$$

Equation 2

$$y = [F_x F_y F_z M_x M_y M_z]^T \qquad (2)$$

Equation 3

$$u_i = [F_{xi} F_{yi} F_{zi}]^T \qquad (3)$$

Equation 4

$$C = [m \times n] \qquad (4)$$

The coefficient matrix C includes parameters $C_{11} \ldots C_{mn}$. The parameters $C_{11} \ldots C_{mn}$ are determined from the vehicle specifications. The number of rows of the coefficient matrix C corresponds to the target number m of the center of gravity six-component in vehicle control. The target number m of the center of gravity six-component in vehicle control is the number of motions to be controlled in vehicle control. For example, when it is sufficient to control only longitudinal motion, lateral motion, and yaw motion, the target number m is three. In this case, motions other than those in the front-rear direction, the lateral direction, and the yaw direction allow natural events to follow their course.

The number of columns of the coefficient matrix C corresponds to a degree of freedom n of the vehicle control actuator group 4. The degree of freedom n of the vehicle control actuator group 4 is the sum of the degrees of freedom of the actuators constituting the vehicle control actuator group 4.

The drive actuator 41 has one degree of freedom when the front wheel braking-driving force and the rear wheel braking-driving force are fixedly distributed (for example, when they are distributed at 50:50). The drive actuator 41 has two degrees of freedom when only the distribution of the front wheel braking-driving force and the rear wheel braking-driving force can be changed. When the distribution of the braking-driving force of the right front wheel and the braking-driving force of the left front wheel can be changed while the front wheel braking-driving force and the rear wheel braking-driving force are fixedly distributed, the drive actuator 41 has two degrees of freedom. Similarly, when the distribution of the braking-driving force of the right rear wheel and the braking-driving force of the left rear wheel can be changed while the front wheel braking-driving force and the rear wheel braking-driving force are fixedly distributed, the drive actuator 41 has two degrees of freedom.

When the distribution of the braking-driving force of the right front wheel and the braking-driving force of the left front wheel can be changed and the distribution of the braking-driving force of the right rear wheel and the braking-driving force of the left rear wheel can be changed while the front wheel braking-driving force and the rear wheel braking-driving force are fixedly distributed, the drive actuator 41 has three degrees of freedom. In addition, when the distribution of the front wheel braking-driving force and the rear wheel braking-driving force can be changed and the distribution of the braking-driving force of the right front wheel and the braking-driving force of the left front wheel can be changed, the drive actuator 41 has three degrees of freedom. Similarly, when the distribution of the front wheel braking-driving force and the rear wheel braking-driving force can be changed and the distribution of the braking-driving force of the right rear wheel and the braking-driving force of the left rear wheel can be changed, the drive actuator 41 has three degrees of freedom.

The drive actuator 41 has four degrees of freedom when the distribution of the braking-driving force for each of the four wheels can be changed individually. An example of the degree of freedom of the brake actuator 42 is the same as that of the drive actuator 41, and therefore the description thereof is omitted. The degree of freedom of the brake actuator 42 and the degree of freedom of the drive actuator 41 need not be the same.

Since the front wheel steering actuator 43 controls only the front wheel steering force, it has one degree of freedom, and since the rear wheel steering actuator 44 also controls only the rear wheel steering force, it has one degree of freedom. The vehicle control actuator group 4 has two degrees of freedom when the vehicle control actuator group 4 has the front wheel steering actuator and the rear wheel steering actuator, and the front wheel steering actuator and the rear wheel steering actuator are controlled respectively.

The active stabilizer 45 has one degree of freedom for controlling roll rigidity only, and the active suspension 46 has three degrees of freedom. The active suspension 46 is provided on each of the four-wheel tires. The body of the vehicle has three degrees of freedom (roll, pitch, and yaw).

The degree of freedom n of the vehicle control actuator group 4 may be fixed values according to the specifications of the vehicle or may be values varying according to the state of each actuator. For example, if an abnormality is detected in each actuator, the degree of freedom n of the vehicle control actuator group 4 may be reduced by assuming that the actuator becomes unusable. If it is determined that thermal protection is necessary for each actuator, the degree of freedom n of the vehicle control actuator group 4 may be reduced as not using the actuator. The method of known can be adopted for the abnormality detection of the actuator and the determination of the thermal protection.

The vehicle control unit 14 transmits a control command to the vehicle control actuator group 4 based on the tire three-component "u" of the four wheels calculated by the tire three-component calculation unit 13, thereby realizing vehicle control according to the driver input.

The vehicle control unit 14 may have a function of a device-driver for converting the tire three-component "u" of the four wheels into a control command adapted to an interface of each actuator. The vehicle control unit 14 may convert the longitudinal force $F_{xi}$ of each wheel into a control command $F_{xci}$ for the drive actuator 41 by, for example, driving force waveform shaping (driving system damping control). For the driving force waveform shaping, for example, an inverse driving system model of known can be used. The vehicle control unit 14 may output the control command of the longitudinal force as it is. The control command for the brake actuator 42 may be the same.

The vehicle control unit 14 may convert the lateral forces $F_{yi}$, the sideslip angle β, the yaw angular velocity "r", and the vehicle speed $V_x$ in the front-rear direction of each wheel into the control command $\delta_f$ for the front wheel steering actuator 43 and the control command $\delta_r$ for the rear wheel steering actuator 44, for example, by the steering angle calculations of known. The vehicle control unit 14 may convert the vertical force $F_{zi}$ of each wheel into a control command for the active stabilizer 45 by using, for example, the inverse active stabilizer model of known. When the active stabilizer 45 uses the roll moment as an interface, it converts the roll moment by coordinate transformation. The vehicle control unit 14 may convert the vertical force $F_{zi}$ of each wheel into a control command for the active suspension 46 by using, for example, an inverse active suspension model of known.

[Processing of Tire Three-Component Calculation Unit]

In the present embodiment, as an example, a case where a vehicle control actuator (for example, an in-wheel motor, a brake, etc.) that generates a longitudinal force of a tire on four wheels of the vehicle is used to control the longitudinal force, roll, pitch, and yaw of the vehicle of the center of gravity six-component will be described. In this case, the center of gravity six-component y can be expressed by the following equation (5).

Equation 5

$$y=[F_x M_x M_y M_z]^T \quad (5)$$

The tire three-component u of the four wheels can be expressed by the following equation (6).

Equation 6

$$u=[F_{xfl} F_{xfr} F_{xrl} F_{xrr}]^T \quad (6)$$

The coefficient matrix C in this case can be expressed by, for example, the following equation (7). $\theta_f$ is the anti-dive angle or anti-lift angle of the front wheels, $\theta_r$ is the anti-lift angle or anti-squat angle of the rear wheels, h is the height of the center of gravity, $l_f$ is the distance from the center of gravity to the front wheel axle, $l_r$ is the distance from the center of gravity to the rear wheel axle, $t_f$ is the front wheel tread width, and $t_r$ is the rear wheel tread width.

Equation 7

$$C = \begin{bmatrix} 1 & 1 & 1 & 1 \\ -\frac{t_f}{2}\tan\theta_f & \frac{t_f}{2}\tan\theta_f & \frac{t_r}{2}\tan\theta_r & -\frac{t_r}{2}\tan\theta_r \\ l_f\tan\theta_f - h & l_f\tan\theta_f - h & l_r\tan\theta_r - h & l_r\tan\theta_r - h \\ -\frac{t_f}{2} & \frac{t_f}{2} & -\frac{t_r}{2} & \frac{t_r}{2} \end{bmatrix} \quad (7)$$

The tire three-component calculation unit 13 obtains the tire three-component u corresponding to the center of gravity six-component y to minimize the evaluation function J shown in the following equation (8). This means that the tire three-component u that minimizes the sum of squares of the error from the target value of the center of gravity six-component is obtained.

Equation 8

$$J=|Cu-y|^2 \quad (8)$$

Minimizing Equation (8) is equivalent to minimizing the following equation (9).

Equation 9

$$F(u)=\tfrac{1}{2}u^T(2C^TC)u+(-2C^Ty)^T u \quad (9)$$

The tire three-component calculation unit 13 considers the upper and lower limits of the tire three-component u according to the characteristics of the vehicle control actuator group 4 or the characteristics of each wheel. As characteristics of the vehicle control actuator group 4, for example, characteristics such as the upper and lower limits of the longitudinal force according to the torque characteristics with respect to the rotation speed of the drive motor, and a brake that cannot take a positive value as the longitudinal force can be mentioned. Further, the amount of change from the previous value is limited according to the responsiveness of the actuator, and the upper and lower limits are given. In addition to these, operation limit values set based on heat and the durability of the actuator, upper and lower limits set for the safety of the function of each actuator, and limit values of the change gradient can be mentioned.

As the characteristics of each wheel, the upper and lower limits of the tire acting force that changes according to the wheel load of each wheel, the type of tire, and the road surface condition can be mentioned. For example, the tire acting force of each wheel may be limited based on the wheel load estimated from the amount of motion state of the vehicle detected by an acceleration sensor or the like, or the road surface condition estimated from an image taken by an in-vehicle camera.

The tire three-component calculation unit 13 imposes, on each wheel, a constraint expressed as an inequality corresponding to the upper and lower limits of the tire three-component u according to the characteristics of the vehicle control actuator group 4 or the characteristics of each wheel described above. The constraint is expressed by the following equation (10).

Equation 10

$$G(u)=Au \leq b \quad (10)$$

The matrix A is expressed by the following equation (11) and includes the vector $a_i$ expressed by the following equation (12). Further, the matrix b is expressed by the following equation (13). The sign of the component $a_{ij}$ of the matrix A gives "equal to or greater than" or "equal to or less than" in Equation (10). The value of the component $b_i$ of the matrix b gives the "upper limit value or lower limit value of the component of u" in Equation (10).

Equation 11

$$A=[a_i \dots]^T \quad (11)$$

Equation 12

$$a_i=[a_{ij} \dots ] \quad (12)$$

Equation 13

$$b=[b_i \dots]^T \quad (13)$$

The number of constraints expressed by the inequality corresponds to the number n of degrees of freedom of the vehicle control actuator group 4, and for example, when considering the upper and lower limits for each of the actuators, "i" in Equations (11) to (13) is 1 to 2n. Further, in Equation (12), j is 1 to n. When considering the upper and lower limits for the vehicle control actuator that generates the longitudinal force of the tire on the four wheels of the vehicle as in this example, n is 4, and the number of inequality constraints is eight in total.

The tire three-component calculation unit 13 performs an optimization calculation by a quadratic programming method using an active-set method in order to minimize the evaluation function expressed by Equation (8) under the inequality constraint as in Equation (10). In the active-set method, the constraint expressed by the inequality such as Equation (10) is imposed on each wheel. "The constraint is imposed on each wheel" does not mean that the constraint is always applied when calculating the optimum solution. "The constraint is imposed on each wheel" means that the constraint expressed as an inequality is prepared to be applicable in the calculation of the optimum solution.

In the active-set method, it is determined whether the constraint is valid or invalid for each wheel based on a predetermined optimum condition, the constraint determined to be valid is applied, and a tentative optimum solution is calculated. On the contrary, the constraint determined to be invalid is not applied when the tentative optimum solution is calculated. Here, the application state is changed from invalid to valid or valid to invalid for any one of the constraints of each wheel in one tentative optimum solution calculation. By repeating such a tentative optimum solution calculation until a predetermined optimum condition is satisfied, the optimum solution under the inequality constraint is obtained.

Lagrange's undetermined multiplier method is generally used when calculating a tentative optimum solution. The Lagrange function L is expressed by the following equation (14). Note that $\lambda$ is called a Lagrange multiplier and is a vector expressed by the following equation (15). The number of the component $\lambda_i$ of the Lagrange multiplier corresponds to the number of inequality constraints, and "i" in the following equation (15) is 1 to 2n as in Equations (11) to (13).

Equation 14

$$L(u,\lambda)=F(u)+\lambda G(u) \quad (14)$$

Equation 15

$$\lambda=[\lambda_i \ldots ]^T \quad (15)$$

When Equation (14) is partially differentiated with respect to the tire three-component u and the Lagrange multiplier $\lambda$, the following equation (16) is obtained.

Equation 16

$$\nabla L(u,\lambda)=\nabla F(u)+\lambda \nabla G(u)=0 \quad (16)$$

In Lagrange's undetermined multiplier method, the optimum solution and the Lagrange multiplier are obtained by solving Equation (16). In the active-set method, the inequality constraint determined to be valid is replaced with the equality constraint, which is included in Equation (16) and solved to obtain the optimum solution that minimizes the evaluation function J after applying the valid constraint. "The inequality constraint is replaced with the equality constraint" means replacing the inequality sign in Equation (10) with the equal sign.

The predetermined optimum conditions in the present embodiment are expressed by the following equations (17) to (20). These four equations are called a Karush-Kuhn-Tucker (KKT) condition.

Equation 17

$$(2C^TC)u+(-2C^Ty)+A^T\lambda=0 \quad (17)$$

Equation 18

$$Au \leq b \quad (18)$$

Equation 19

$$\lambda \geq 0 \quad (19)$$

Equation 20

$$\lambda^T(Au-b)=0 \quad (20)$$

Equation (17) is synonymous with Equation (16) and means obtaining the optimum solution using Lagrange's undetermined multiplier method. Further, Equation (18) is synonymous with Equation (10) which is a constraint expressed by an inequality.

Equation (19) is an equation showing the sign of the Lagrange multiplier $\lambda$ based on the relationship between the direction of $\Box F$ and the direction of $\Box G$ in Equation (16). When the Lagrange multiplier $\lambda$ is a positive value, the direction in which $\Box F$ decreases and the direction in which $\Box G$ decreases are opposite. That is, the direction in which the evaluation function J is decreased and the direction in which the inequality constraint is satisfied are opposite. In this case, it can be said that the constraint has to be valid. On the other hand, when the Lagrange multiplier $\lambda$ is a negative value, the direction in which $\Box F$ decreases and the direction in which $\Box G$ decreases are the same. That is, the direction in which the evaluation function J is decreased and the direction in which the inequality constraint is satisfied are the same. In this case, it can be said that the constraint has to be invalidated. When the Lagrange multiplier $\lambda$ is less than 0 and does not satisfy Equation (19), it can be said that there is a constraint to be invalidated.

Equation (20) expresses the relationship between the Lagrange multiplier $\lambda$ and the inequality constraint. When the constraint is invalid, $\lambda_i$ becomes 0. In this case, Equation (20) is satisfied. On the other hand, when the constraint is valid, $\lambda_i$ has a value larger than 0, but since the inequality expressed by Equation (10) is replaced by the equality constraint, the left side of Equation (20) becomes 0, and Equation (20) is satisfied.

In the present embodiment, Equations (17) to (20) are a necessary and sufficient condition for obtaining the optimum solution that minimizes the evaluation function J expressed by Equation (8) under the inequality constraint expressed by Equation (10).

Figure 3B:
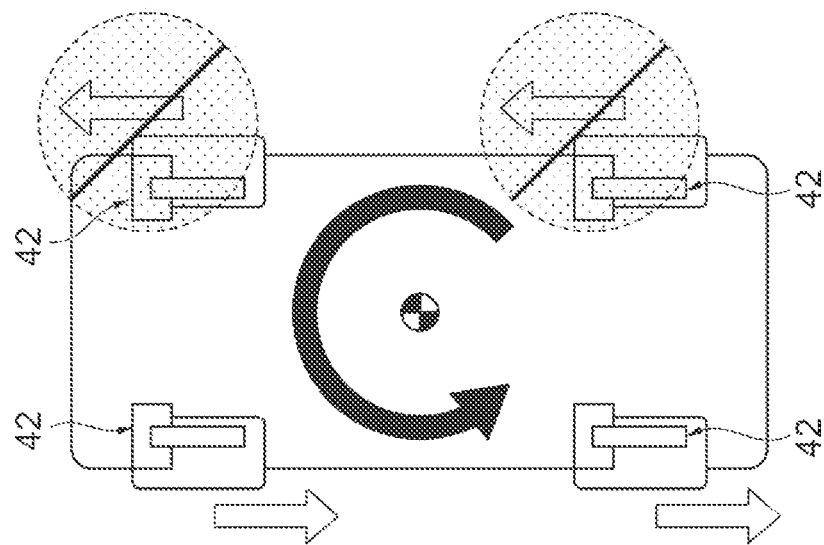
FIG. 3B shows an example in which a brake is used to generate a longitudinal force of each wheel when the target value of the yaw moment is given as in FIG. 3A, as an example of a longitudinal force of each wheel obtained from the center of gravity six-component.
Figure 3A:
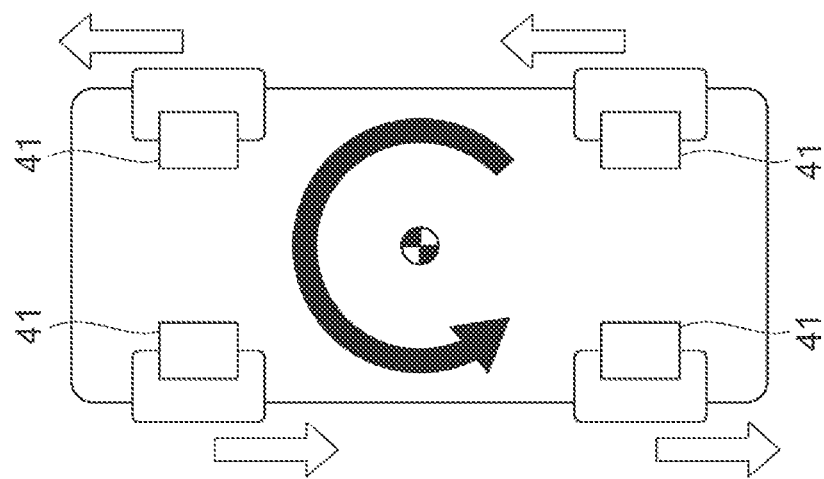
FIG. 3A shows an example in which an in-wheel motor is used as a vehicle control actuator to generate a longitudinal force of each wheel when a target value of a counterclockwise yaw moment is given as a vehicle six-component, as an example of a longitudinal force of each wheel obtained from the center of gravity six-component.

Next, an example of obtaining the longitudinal force of each wheel from the center of gravity six-component will be described with reference to FIGS. 3A and 3B. In FIGS. 3A and 3B, the upward direction is the front of the vehicle, and the state in which the vehicle moves forward is shown. FIG. 3A shows an example in which an in-wheel motor is used as a vehicle control actuator to generate a longitudinal force of each wheel when a target value of a counterclockwise yaw moment is given as a vehicle six-component. FIG. 3B shows an example in which a brake is used to generate a longitudinal force of each wheel when the target value of the yaw moment is given as in FIG. 3A.

In FIG. 3A, it is assumed that the control required value of the longitudinal force of each wheel obtained from the target value of the yaw moment is sufficiently smaller than the upper and lower limit values of the longitudinal force that can be generated by the in-wheel motor. In such a case, it is not necessary to consider the inequality constraint, and by solving Equation (16) in a state in which all the constraints are invalidated, the optimum solution of the longitudinal force of each wheel can be obtained for the target value of the center of gravity six-component. In this case, no iterative calculation occurs, and the number of iterative calculations is zero.

On the other hand, when the brake is used as shown in FIG. 3B, the longitudinal force that can be generated in each wheel can only take a negative value, and the upper limit of the longitudinal force of each wheel is limited to 0 or less. When Equation (16) is solved in a state in which all the constraints are invalidated, the longitudinal force of each wheel may become a value larger than 0. However, such longitudinal force cannot actually be generated. In such a case, in order to obtain the optimum solution, it is necessary to solve Equation (16) with the constraint valid for the front and rear two wheels on the right side.

In the active-set method, it is determined whether the constraint is valid or invalid for each wheel based on the optimum condition expressed by Equations (17) to (20), the constraint determined to be valid is applied, and a tentative optimum solution is calculated. Then, the tentative optimum solution calculation is repeated until the optimum condition expressed by Equations (17) to (20) is satisfied, and the optimum solution is obtained. Not limited to the case where only the target value of the yaw moment is given as shown in FIG. 3B, for example, when the target values of the roll moment and the yaw moment are given at the same time, it is difficult to determine which constraint has to be valid before calculating the tentative optimum solution. In the example of FIG. 3B, for example, when the optimization calculation is started in a state in which all the constraints are invalidated, the tentative optimum solution calculation is repeated for the front and rear two wheels on the right side as much as the constraints are changed from invalid to valid, and the number of iterative calculations is increased by that amount. Thus, the total number of iterative calculations is two.

If an attempt is made to obtain the control required value of the tire three-component by the optimization calculation in accordance with the update of the target value of the center of gravity six-component, the above-mentioned iterative calculation may occur every time the center of gravity six-component is updated. In the tentative optimum solution calculation, it is necessary to perform matrix calculation when solving Equation (16), but since such processing leads to an increase in the calculation load of the vehicle control apparatus, it is desirable to reduce the number of iterative calculations.

[Processing of Vehicle Control Apparatus]

Next, an example of the processing of the vehicle control apparatus 100 according to the present embodiment will be described with reference to FIGS. 4 and 5.

Figure 4:
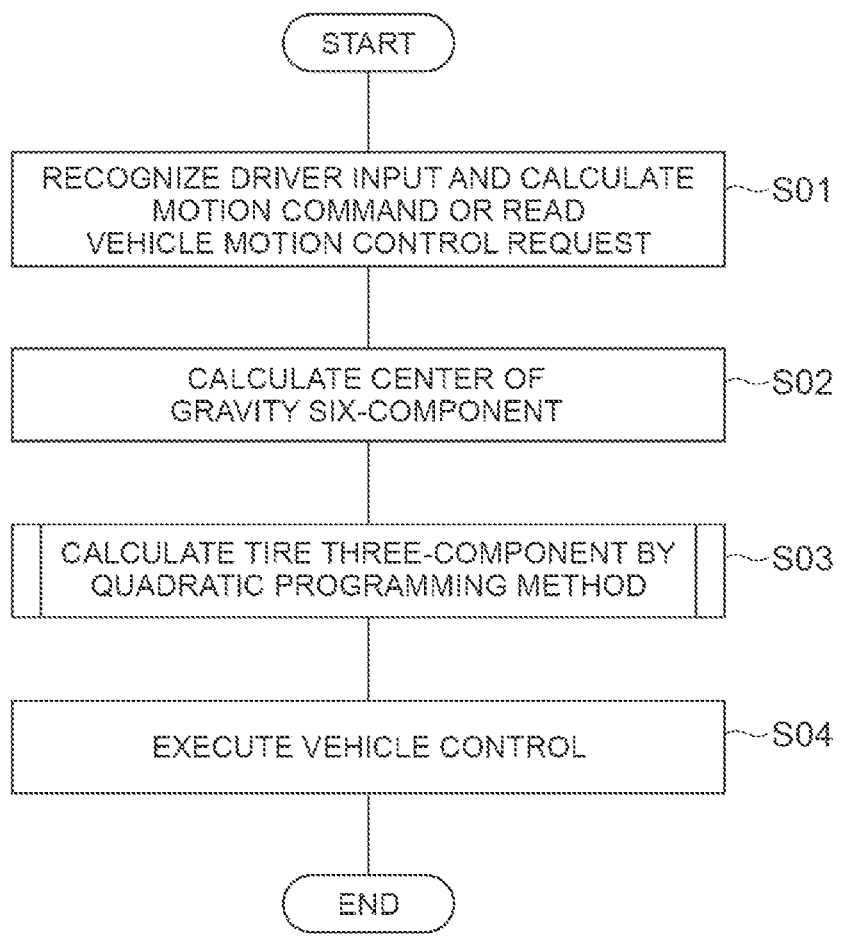
FIG. 4 is a flowchart showing an example of vehicle control processing of the vehicle control apparatus.

FIG. 4 is a flowchart showing an example of vehicle control processing of the vehicle control apparatus 100. As shown in FIG. 4, the ECU 10 of the vehicle control apparatus 100 recognizes the driver input as S01 and calculates a motion command corresponding to the recognized driver input. In addition to the motion command corresponding to the driver input, a vehicle motion control request is read. Next, the ECU 10 calculates the center of gravity six-component y as S02 based on the motion command or the vehicle motion control request corresponding to the driver input. Next, in S03, the ECU 10 calculates the tire three-component u of each wheel by the quadratic programming method using the active-set method based on the center of gravity six-component y. Then, in S04, the ECU 10 realizes vehicle control by transmitting a control command based on the tire three-component u of each wheel to the vehicle control actuator group.

Figure 5:
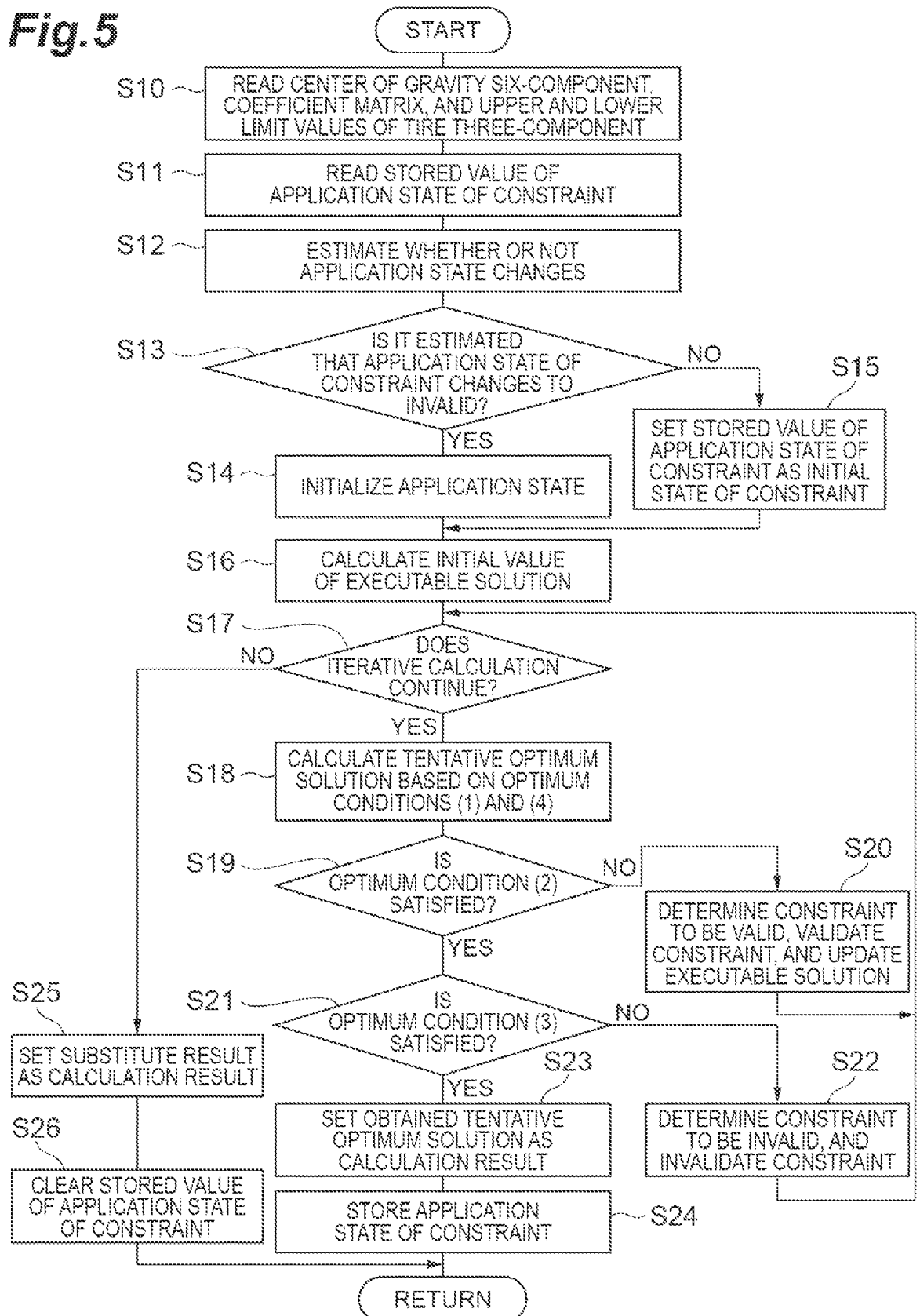
FIG. 5 is a flowchart showing an example of calculation processing of the tire three-component.

FIG. 5 is a flowchart showing an example of calculation processing of the tire three-component. The ECU 10 calculates the optimum solution of the tire three-component u of each wheel based on the four optimum conditions expressed by Equations (17) to (20) described above by the tire three-component calculation unit 13. Here, Equation (17) is the optimum condition (1), Equation (18) is the optimum condition (2), Equation (19) is the optimum condition (3), and Equation (20) is the optimum condition (4). The tire three-component calculation unit 13 performs an optimization calculation in accordance with the update of the center of gravity six-component y, the coefficient matrix C, or the upper and lower limit values b of the tire three-component.

In S10, the tire three-component calculation unit 13 reads the center of gravity six-component y, the coefficient matrix C, and the upper and lower limit values b of the tire three-component. In addition to these values, the previous value of the center of gravity six-component y, the previous value of the upper and lower limit values b of the tire three-component, the previous value of the coefficient matrix C, and the previous value of the Lagrange multiplier λ may be read as the values used for estimating the change in the application state of the constraint in S12.

In S11, the tire three-component calculation unit 13 reads the stored value of the application state of the constraint. In some embodiments, when there is no stored value, for example, the stored value may be set to a state in which all the constraints are invalidated.

In S12, the tire three-component calculation unit 13 estimates whether or not the application state of the constraint changes. The method of estimating whether or not the application state changes will be described later.

In S13, the tire three-component calculation unit 13 selects whether to use the stored value of the application state of the constraint or to initialize the application state based on the estimation result in S12. When it is estimated that the application state changes, as the initialization of the application state of the constraint in S14, for example, all the constraints may be invalidated. In addition, only the constraint that is estimated to change from valid to invalid may be invalidated. On the other hand, when it is estimated that the application state does not change, the process proceeds to S15, and the tire three-component calculation unit 13 sets the stored value of the application state as the initial state of the constraint.

In S16, the tire three-component calculation unit 13 calculates the initial value of the executable solution. An executable solution is a solution that satisfies Equation (10) and exists within the constraints expressed by the inequality. When there is no stored value of the application state of the constraint, or when the application state of the constraint is initialized, for example, the median of the upper and lower limits of the constraint may be set as the initial value of the executable solution.

In S17, the tire three-component calculation unit 13 determines whether or not to continue the iterative calculation. When performing the first tentative optimum solution calculation, the process proceeds to S18 as it is. The method of determining whether or not to continue the iterative calculation will be described later.

In S18, the tire three-component calculation unit 13 calculates a tentative optimum solution u* and a Lagrange multiplier λ* of the tire three-component according to the following equation (21). The following equation (21) is synonymous with solving the simultaneous equations of Equations (17) and (20), and means obtaining a tentative optimum solution satisfying the optimum conditions (1) and (4).

Equation 21

$$\begin{bmatrix} u^*_{(k)} \\ \lambda^*_{(k)} \end{bmatrix} = \begin{bmatrix} 2C^T C & A^T_{(k)} \\ A_{(k)} & 0 \end{bmatrix}^{-1} \begin{bmatrix} 2C^T y \\ b_{(k)} \end{bmatrix} \quad (21)$$

In Equation (21), k indicates the number of tentative optimum solution calculations. In the first tentative optimum solution calculation, k is 1. Further, $A_{(k)}$ and $b_{(k)}$ are reconstructed components of A and b so that only valid constraints are replaced with equality constraints and included in Equation (16).

In S19, the tire three-component calculation unit 13 determines whether or not there is a constraint to be valid based on Equation (18). Here, when Equation (18) is satisfied, it means that the optimum condition (2) is satisfied. When any one of the constraints does not satisfy Equation (18), the process proceeds to S20.

In S20, the tire three-component calculation unit 13 determines the constraint to be valid, validates the determined constraint, and updates the executable solution. According to the following equation (22), $\tau_i$ corresponding to each inequality constraint is obtained. Here, $\tau_i$ is limited to a range of 0 or more and 1 or less. As shown in the following equation (23), the smallest value in $\tau_i$ is selected, and it is determined that the corresponding inequality constraint has to be valid. Then, according to the following equation (24), an executable solution located on the constraint determined to be valid is obtained. According to the following equation (24), an executable solution $u_{(k+1)}$ in the next iterative calculation is obtained based on the current executable solution $u_{(k)}$ and the tentative optimum solution $u^*_{(k)}$ obtained in S18.

Equation 22

$$\tau_i = \frac{-(a_i u_{(k)} - b_i)}{a_i(u^*_{(k)} - u_{(k)})} \quad (22)$$

Equation 23

$$\tau = \min_{i \in \{1,\ldots,2n\}} \tau_i \quad (23)$$

Equation 24

$$u_{(k+1)} = u_{(k)} + \tau(u^*_{(k)} - u_{(k)}) \quad (24)$$

In S21, the tire three-component calculation unit 13 determines whether or not there is a constraint to be invalidated based on Equation (19). Here, when Equation (19) is satisfied, it means that the optimum condition (3) is satisfied. When any one of the constraints does not satisfy Equation (19), the process proceeds to S22.

In S22, the tire three-component calculation unit 13 determines the constraint to be invalidated. The smallest Lagrange multiplier $\lambda_i$ is selected from those with less than 0, and the constraint corresponding to the Lagrange multiplier $\lambda_i$ is invalidated.

By the processing in S18, S19, and S21, in S23, it can be said that the optimum solution satisfying all the optimum conditions (1) to (4) has been obtained. In S23, the tire three-component calculation unit 13 substitutes the obtained tentative optimum solution u* into u and sets it as a result of the calculation of the optimum solution (optimum solution of the tire three-component). Further, in S24, the tire three-component calculation unit 13 stores the application state of the constraint on the assumption that all the optimum conditions (1) to (4) are satisfied.

The tire three-component calculation unit 13 determines whether or not to continue the iterative calculation in S17 after proceeding to S20 or S22. For example, an upper limit is set for the number of iterative calculations, and when the number of iterative calculations exceeds the upper limit, the continuation of the iterative calculation is stopped. Further, for example, when the amount of change between the tentative optimum solution obtained in the previous iterative calculation and the tentative optimum solution obtained in the current iterative calculation is equal to or less than a predetermined threshold value, the continuation of the iterative calculation may be stopped. When the iterative calculation is to be continued, the process proceeds to S18. On the other hand, when stopping the iterative calculation, the process proceeds to S25.

In S25, it cannot be said that the optimum solution satisfying all the optimum conditions (1) to (4) has been obtained. Therefore, in S25, the tire three-component calculation unit 13 substitutes a substitute result into u instead of the tentative optimum solution u*, and sets it as a result of the calculation of the optimum solution. In some embodiments, as a substitute result, for example, an optimum solution that satisfies all the optimum conditions (1) to (4) obtained in the optimization calculation before the previous time may be set.

In S26, the tire three-component calculation unit 13 clears the stored value of the application state of the constraint on the assumption that all the optimum conditions (1) to (4) are not satisfied. This is because it is considered that the application state of the constraint when all the optimum conditions (1) to (4) are not satisfied has not to be applied to the next optimization calculation.

When the tire three-component calculation unit 13 stores the application state of the constraint in S24, the tire three-component calculation unit 13 reads the stored value of the application state in S11 in the next optimization calculation. Then, the tire three-component calculation unit 13 estimates in S12 whether or not the application state of the constraint changes, and in S13, sets the stored value of the application state of the constraint as the initial state of the constraint.

In S16, the tire three-component calculation unit 13 calculates the initial value of the executable solution. When the stored value of the application state of the constraint is set as the initial state of the constraint, as the initial value of the executable solution, in addition to the median of the upper and lower limits of the constraint, for example, the optimum solution obtained in the previous optimization calculation may be set. In some embodiments, in this case, in S24 in the previous optimization calculation, the optimum solution may be stored in addition to the application state of the constraint.

By setting the stored value of the application state of the constraint to the initial state as described above, the tire three-component calculation unit 13 calculates the tentative optimum solution in a state in which the constraint enabled in the previous optimization calculation is valid, for example, in the first S18. Thereby, the iterative calculation to change the constraint from invalid to valid can be omitted.

As an estimation of whether or not the application state of the constraint changes in S12, for example, a change in the sign of the center of gravity six-component y can be used. The previous value of the center of gravity six-component y may be compared with the current value thereof, and it may be estimated that the application state of the constraint changes when the sign changes. For example, when the sign of the yaw moment or the roll moment changes, the sign of the longitudinal force of each of the left and right wheels may change. For example, when a brake is used, the wheel that generates the braking force may switch between left and right. That is, the wheel to which the inequality constraint has to be applied may change.

In addition, as an estimation of whether or not the application state of the constraint changes, for example, when the amount of change of the center of gravity six-component y from the previous value is larger than a predetermined threshold value, when the amount of change in the value of the coefficient matrix C from the previous value is larger than a predetermined threshold value, or when the amount of change of the upper and lower limit values b of the inequality constraint from the previous value is larger than a predetermined threshold value, it may be estimated that the application state of the constraint changes.

Further, in addition to the above-mentioned conditions, it may be estimated whether or not the application state of the constraint in each wheel changes based on the Lagrange multiplier $\lambda$. Since the magnitude of the Lagrange multiplier $\lambda$ represents the strength of the constraint, it is considered that the application state of the constraint is unlikely to change when the value of the Lagrange multiplier $\lambda$ is large. For example, when the positive or negative of the center of gravity six-component y is switched and any one of the previous values of the Lagrange multiplier $\lambda_i$ of each wheel is equal to or less than a predetermined threshold value, it may be estimated that the application state of the constraint changes. In some embodiments, in this case, in S24 in the previous optimization calculation, the Lagrange multiplier $\lambda$ may be stored in addition to the constraint application state.

In addition to the value of the Lagrange multiplier $\lambda$, it may be estimated whether or not the application state of the constraint in each wheel changes based on the differential value of the Lagrange multiplier $\lambda$. When the value of the Lagrange multiplier $\lambda$ tends to decrease and the value of the Lagrange multiplier $\lambda$ is equal to or less than a predetermined threshold value, it may be estimated that the application state of the constraint changes.

Operation and Effect of the Disclosure

Figure 6:
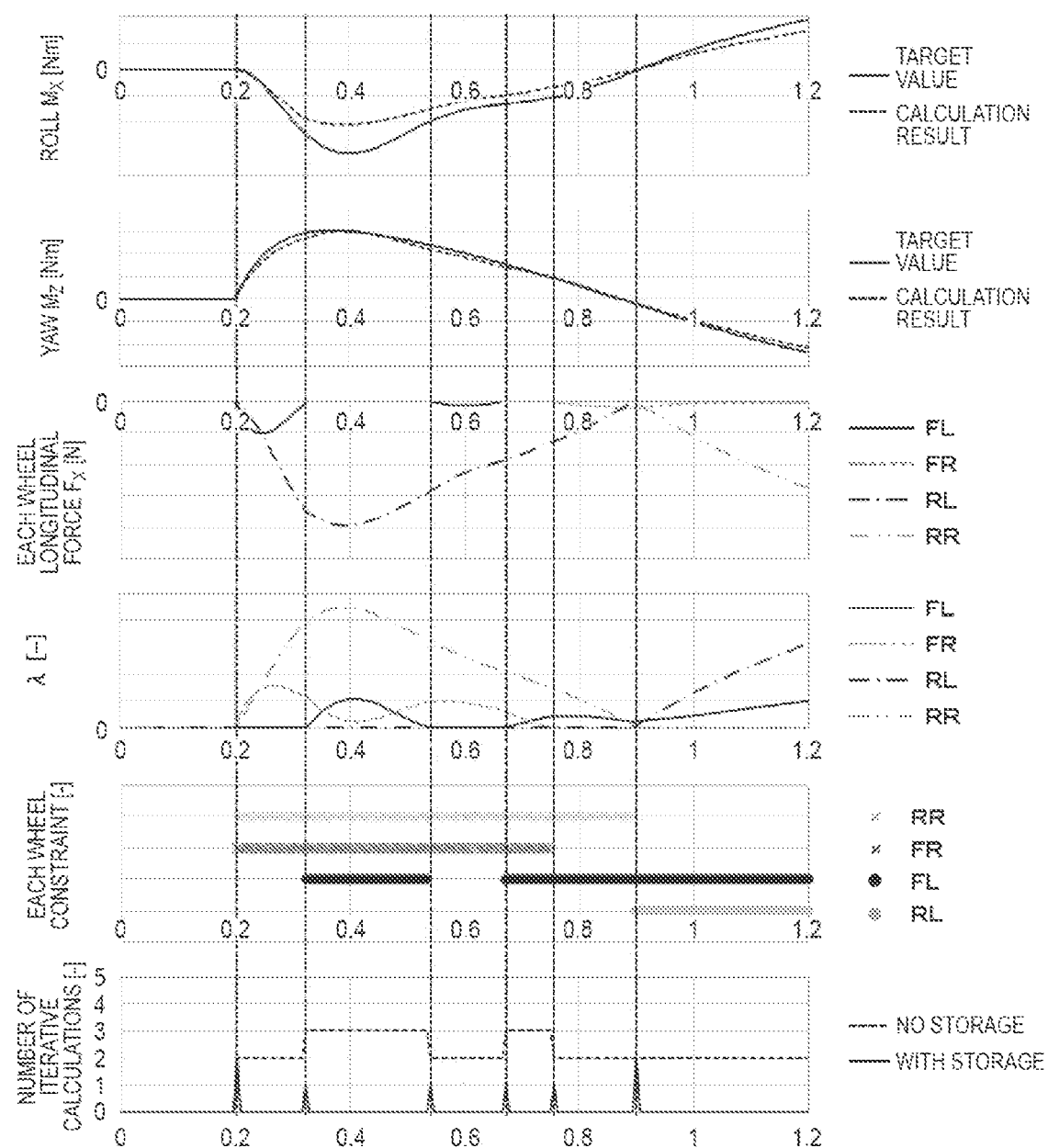
FIG. 6 is a diagram for comparing and describing whether or not an application state of a constraint is stored.
Figure 7:
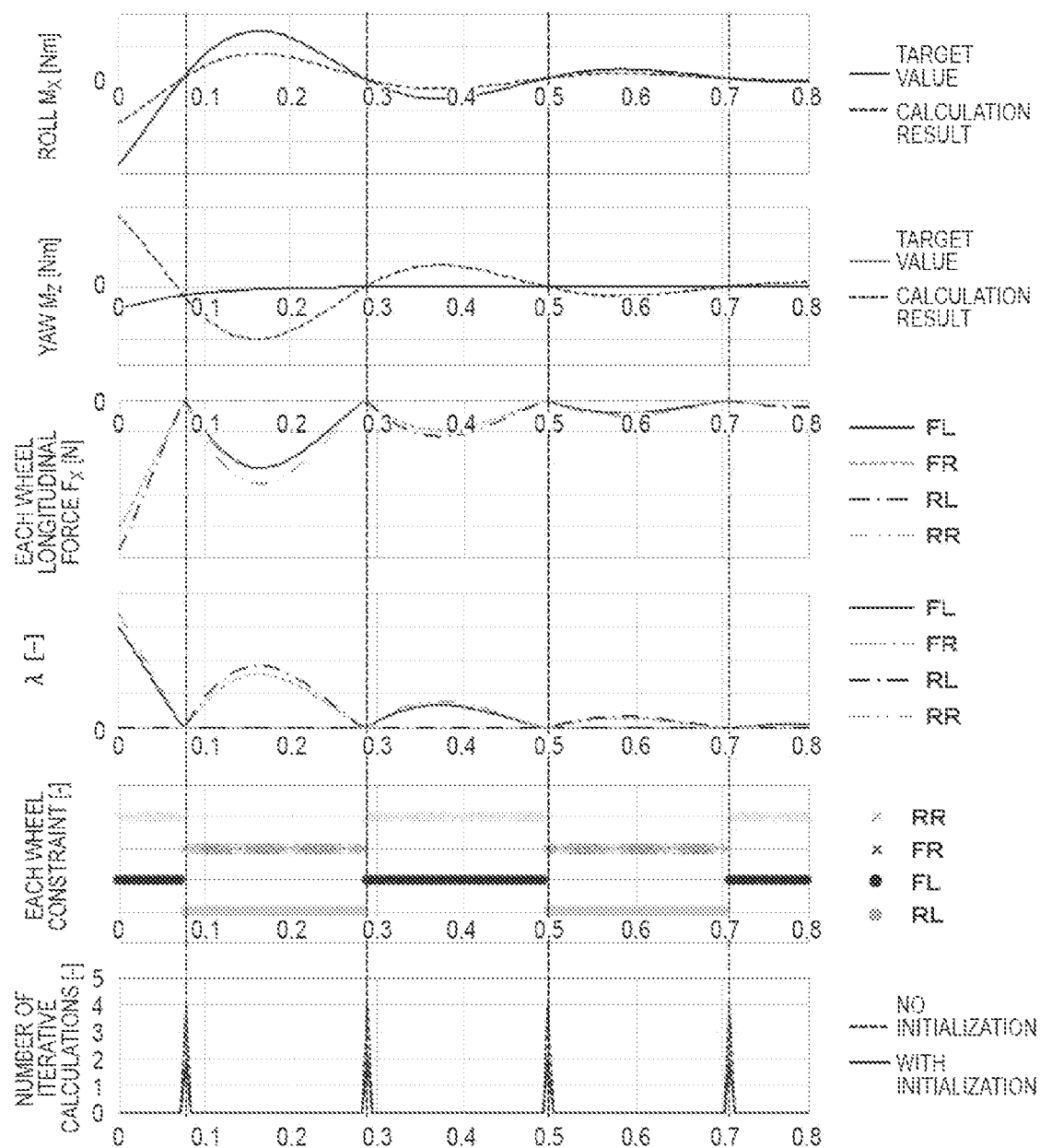
FIG. 7 is a diagram for comparing and describing whether or not the application state of the constraint is initialized.
Figure 8:
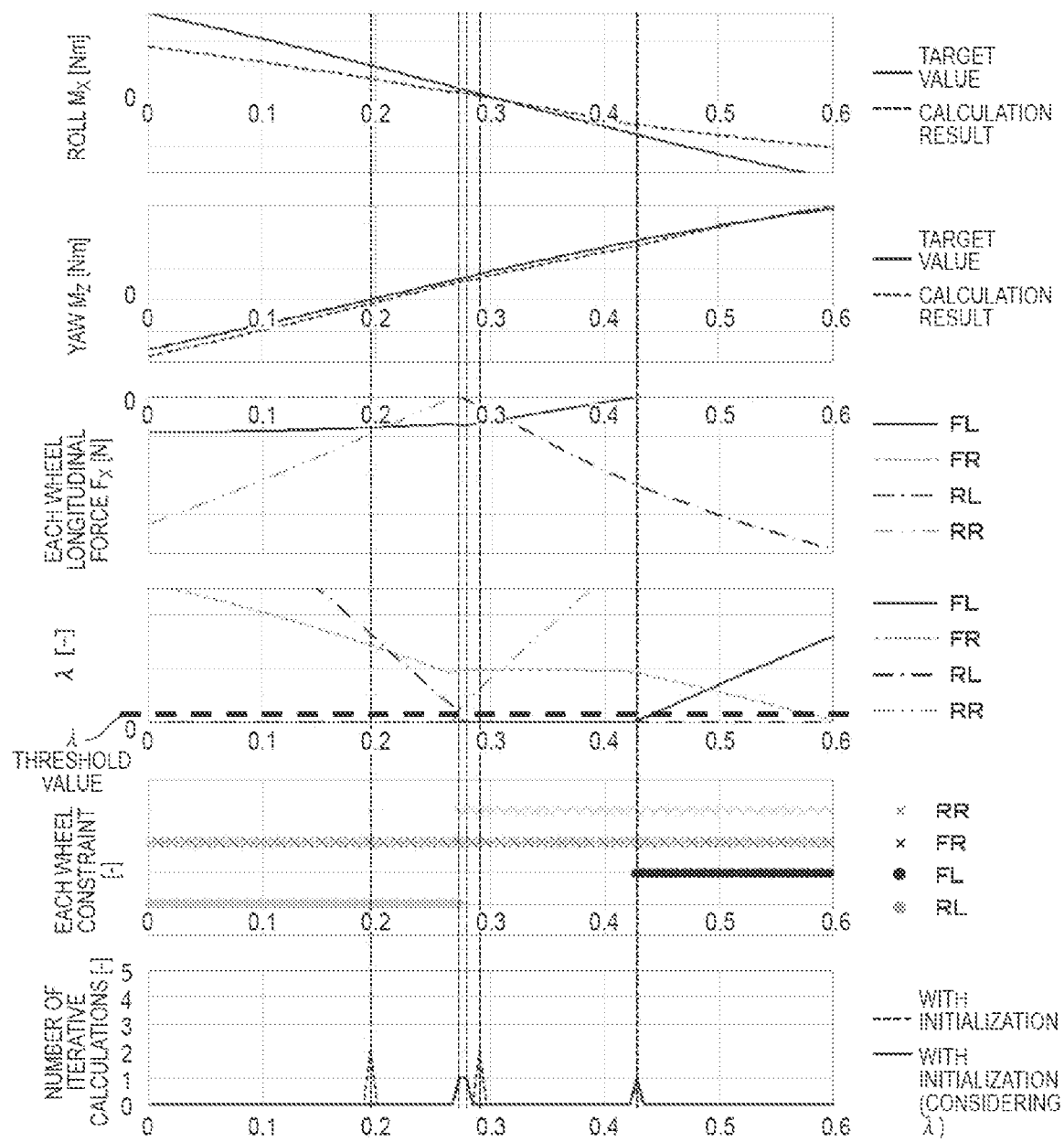
FIG. 8 is a diagram for comparing and describing whether or not a Lagrange multiplier is considered in the initialization of the application state of the constraint.

Referring to FIG. 6, the operation and effect of the process of calculating the optimum solution by the quadratic programming method using the active-set method will be described using the stored value of the application state of the constraint. Further, referring to FIGS. 7 and 8, changes in the application state of the constraint are estimated, and when it is estimated that the change occurs, the operation and effect of the process of initializing the application state will be described. FIGS. 6 to 8 show an example in which the roll moment and the yaw moment within the center of gravity six-component are controlled when the vehicle makes a lane change. Here, the target values of the longitudinal force and the pitch moment in the center of gravity six-component are 0. In addition, an example is shown in which a brake is used as a vehicle control actuator to generate a longitudinal force of four wheels.

FIG. 6 is a diagram for comparing and describing whether or not an application state of a constraint is stored. In FIG. 6, as shown on each vertical shaft, in order from the top, the roll moment, the yaw moment, the longitudinal force in each wheel, the Lagrange multiplier $\lambda$ in each wheel, the application state of the constraint in each wheel, and the number of iterative calculations are shown. The application state of the constraint in each wheel means that the constraint is valid at the time when there is a plot, and that the constraint is invalid at the time when there is no plot. The roll moment, the yaw moment, the longitudinal force in each wheel, and Lagrange multiplier $\lambda$ in each wheel are positive values in the upper part of the vertical shaft and negative values in the lower part of the vertical shaft with respect to 0.

Specifically, FIG. 6 corresponds to the first half portion when the vehicle makes a lane change. In the graph of the roll moment and the yaw moment, the target values of the roll moment and the yaw moment included in the center of gravity six-component are shown by solid lines. The target value of the center of gravity six-component does not take into account the inequality corresponding to the upper and lower limits of the tire three-component according to the characteristics of the vehicle control actuator group 4 or the characteristics of each wheel. In FIG. 6, the longitudinal force of each wheel is controlled by a brake instead of an in-wheel motor. That is, the longitudinal force in each wheel can only take a negative value. Therefore, the follow-up of the center of gravity six-component generated as a result of the calculation of the optimum solution shown by the dashed line to the target value of the center of gravity six-component is limited in some parts.

In FIG. 6, at time 0.2, the absolute value of the target value of the center of gravity six-component becomes larger than 0 by starting the steering, and the application state of the constraint in each wheel changes. Specifically, in the right rear wheel (RR) and the right front wheel (FR), the plot changes from absence to presence. Each of these changes means that the tentative optimum solution did not satisfy the optimum condition when the constraints were invalid in the right rear wheel (RR) and the right front wheel (FR), so that each constraint changed from invalid to valid. That is, in the optimization calculation at time 0.2, the constraints of the right rear wheel (RR) and the right front wheel (FR) are changed from invalid to valid, and further tentative optimum solution calculation is performed. Thus, the number of iterative calculations is increased by 1, and the total number of iterative calculations is two.

The tire three-component calculation unit 13 of the present embodiment stores the application state of the constraint when the optimum solution satisfying the optimum condition is obtained in the optimization calculation at time 0.2. Then, at the next optimization calculation after time 0.2, the stored value of the application state is set as the initial state of the constraint, and the tentative optimum solution calculation is started. Here, when the optimum solution satisfying the optimum condition is obtained, the application state of the constraint is stored as in the case of time 0.2. The optimization calculation is performed in the same manner in the later optimization calculations further after time 0.2.

From time 0.2 to around time 0.3, the plot remains unchanged on the right rear wheel (RR) and right front wheel (FR). That is, it shows that the optimum condition is satisfied while the constraints of the right rear wheel (RR) and the right front wheel (FR) are valid. Since the tire three-component calculation unit 13 of the present embodiment start the tentative optimum solution calculation from the state in which the constraints of the right rear wheel (RR) and the right front wheel (FR) are valid in the optimization calculation at each time after time 0.2, there is no need to change the constraints, and the optimum solution can be obtained by one tentative optimum solution calculation. That is, the number of iterative calculations is zero.

On the other hand, when the application state of the constraint is not stored and, for example, the tentative optimum solution calculation is started with the state in which all the constraints in each wheel are invalidated as the initial state, a tentative optimum solution calculation is required to make the constraints of the right rear wheel (RR) and the right front wheel (FR) valid, and the number of iterative calculations is two at each time from time 0.2 to around time 0.3.

Next, at around time 0.3, the application state of the constraint on the left front wheel (FL) changes. Specifically, in the left front wheel (FL), the plot changes from absence to presence. In this case, the tire three-component calculation unit 13 of the present embodiment starts the tentative optimum solution calculation from the state in which the constraints of the right rear wheel (RR) and the right front wheel (FR) are valid based on the application state of the constraints stored in the previous optimization calculation. Therefore, the number of iterative calculations increases by the amount that the constraint of the left front wheel (FL) is changed from invalid to valid. That is, the number of iterative calculations is one. In addition, the application state of the constraint of each wheel does not change at each time from this point to around 0.5. In the present embodiment, after the constraint of the left front wheel (FL) is once validated, the tentative optimum solution calculation is started from the state in which the constraints of the right rear wheel (RR), the right front wheel (FR), and the left front wheel (FL) are validated. Therefore, it is not necessary to change the constraint in the optimization calculation at each time, and the optimum solution can be obtained by one tentative optimum solution calculation. That is, the number of iterative calculations is zero.

On the other hand, when the application state of the constraint is not stored and, for example, the tentative optimum solution calculation is started with the state in which all the constraints in each wheel are invalidated as the initial state, a tentative optimum solution calculation is required to make the constraints of the right rear wheel (RR), the right front wheel (FR), and the left front wheel (FL) valid, and the number of iterative calculations is three at each time from around time 0.3 to around time 0.5.

As described above, when an application state of a constraint when a solution satisfying an optimum condition is obtained is stored, and a tentative optimum solution calculation with the stored value of the application state is started as the initial state of the constraint in the next optimization calculation, it is possible to reduce the number of iterative calculations.

The tire three-component calculation unit 13 may estimate whether or not the application state of the constraint in each wheel changes. When it is estimated that the application state changes when the constraint that was valid in any of the wheels is invalidated, the tire three-component calculation unit 13 may initialize the stored application state.

FIG. 7 is a diagram for comparing and describing whether or not the application state of the constraint is initialized. In FIG. 7, each vertical shaft is the same as in FIG. 6. Specifically, FIG. 7 corresponds to the timing at which the lane change of the vehicle ends, and the behavior of the roll of the vehicle is converged. The target value of the roll moment included in the center of gravity six-component alternately changes between a positive value and a negative value. Therefore, the wheels that generate the braking force of the brake are switched alternately on the left and right.

In FIG. 7, at around time 0.1, the application state of the constraint in each wheel changes. Specifically, in the right rear wheel (RR) and the left front wheel (FL), the plot changes from presence to absence, and in the right front wheel (FR) and the left rear wheel (RL), the plot changes from absence to presence. Each of these changes means that the tentative optimum solution did not satisfy the optimum condition when the application state of the constraint in each wheel was the same as the previous state, so that each constraint changed from invalid to valid or valid to invalid.

In FIG. 7, the tire three-component calculation unit of the present embodiment estimates that the application state of the constraint changes when the positive or negative of the target value of the center of gravity six-component is switched. When it is estimated that the application state changes when the constraints that were valid in the right rear wheel (RR) and the left front wheel (FL) are invalidated, the tire three-component calculation unit 13 initializes the stored application state. Here, as the initialization of the application state of the constraint, the constraint for all the wheels is invalidated. This initialization eliminates the need for iterative calculations to change the constraints in the right rear wheel (RR) and left front wheel (FL) from valid to invalid. As a result, the iterative calculation is performed by the amount that the constraints in the right front wheel (FR) and the left rear wheel (RL) are changed from invalid to valid, and the total number of iterative calculations is two. In FIG. 7, in addition to around time 0.1, the same applies to around time 0.3, around time 0.5, and around time 0.7.

On the other hand, when the stored application state of the constraint is not initialized, the constraint in the right rear wheel (RR) and the left front wheel (FL) is changed from valid to invalid and the constraint in the right front wheel (FR) and the left rear wheel (RL) is changed from invalid to valid. Thus, the number of iterative calculations is increased by 1 by the amount that each constraint is changed, and the total number of iterative calculations is four.

Further, the tire three-component calculation unit may estimate whether or not the application state of the constraint in each wheel changes based on the Lagrange multiplier $\lambda$ in addition to the above-mentioned condition regarding the center of gravity six-component. For example, when the positive or negative of the target value of the center of gravity six-component is switched and the value of the Lagrange multiplier $\lambda$ of each wheel is equal to or less than a predetermined threshold value, it may be estimated that the application state of the constraint changes.

FIG. 8 is a diagram for comparing and describing whether or not the Lagrange multiplier $\lambda$ is considered in the initialization of the application state of the constraint. In FIG. 8, each vertical shaft is the same as in FIGS. 6 and 7. The dashed line shown in the drawing of the Lagrange multiplier $\lambda$ indicates a predetermined threshold value of the Lagrange multiplier $\lambda$. Specifically, FIG. 8 corresponds to the middle of the lane change of the vehicle, and the positive and negative signs of the target values of the roll moment and the yaw moment included in the center of gravity six-component change.

In FIG. 8, at around time 0.2, the positive or negative of the target value of the yaw moment is switched. However, in the right front wheel (FR) and the left rear wheel (RL), the plot remains unchanged. In this case, the value of the Lagrange multiplier for the right front wheel (FR) and the left rear wheel (RL) is larger than the threshold value, and when the Lagrange multiplier $\lambda$ is taken into consideration, it is not estimated that the application state of the constraint changes. Therefore, by using the stored value of the application state of the constraint, the number of iterative calculations is zero.

On the other hand, when the change in the application state of the constraint is estimated only by switching the positive or negative of the target value of the vehicle six-component without considering the Lagrange multiplier $\lambda$, it is estimated that the application state changes, and the stored application state of the constraint is initialized. In this case, the iterative calculation occurs by the amount that the constraints of the right front wheel (FR) and the left rear wheel (RL) are changed from invalid to valid, and the total number of iterative calculations is two. Since such initialization leads to an increase in the number of iterative calculations, it is possible to reduce the number of iterative calculations more appropriately if the initialization is treated as unnecessary. The same can be said when the positive or negative of the target value of the roll moment is switched around time 0.3.

As described above, with the vehicle control apparatus 100, an application state of the constraint when the optimum solution satisfying the predetermined optimum condition is obtained is stored, and the tentative optimum solution calculation is started with the stored value of the application state of the constraint as the initial state of the constraint in the next optimization calculation. That is, in the next optimization calculation, the tentative optimum solution calculation is started in a state in which the constraint valid when the optimum solution is obtained is applied. Thereby, it is possible to reduce the number of iterative calculations that occur when the constraints are valid, as compared with the case in which the calculation is started from the state in which all the constraints are invalidated.

In the vehicle control apparatus 100, the tire three-component calculation unit 13 estimates whether or not an application state of the constraint changes in each wheel, and initializes the stored application state of the constraint when it is estimated that the application state changes when the constraint that was valid is invalidated in any of the wheels. Thereby, for example, since iterative calculation occurs when invalidating the constraint that was valid, by estimating that the constraint is invalidated in advance and initializing the constraint in such a case, it is possible to omit the iterative calculation for making the constraint that was valid invalid.

Modification Example

Although the embodiment of the present disclosure has been described above, the present disclosure is not limited to the above-described embodiment. The present disclosure can be implemented in various forms including various modifications and improvements based on the knowledge of those skilled in the art, including the above-described embodiment.

In the above embodiment, the vehicle control apparatus 100 executes the vehicle control based on the driver input, but the vehicle control may be executed based on the vehicle motion control request. The vehicle motion control request may be a control request corresponding to the accelerator operation, the brake operation, and the steering generated based on, for example, driving support control or autonomous driving control. In this case, in order to calculate a vehicle motion control request, the vehicle control apparatus 100 may include a vehicle position detection unit (for example, a GPS receiver) for detecting the position of the vehicle, an in-vehicle sensor such as a camera and/or a laser radar, and a map database for storing map information in a communicable manner with the ECU 10. The ECU 10 may have a configuration and a function of calculating a vehicle motion control request based on the information from these configurations. In addition, the vehicle motion control request may be a control request for controlling the behavior of the vehicle based on the disturbance amount detected by a device for detecting the amount of motion state. In this case, the vehicle control apparatus 100 may have a configuration and a function of capturing a signal from a device for detecting the amount of motion state such as an acceleration sensor in order to calculate a vehicle motion control request.

In the above embodiment, as an example, a case where a vehicle control actuator (for example, an in-wheel motor, a brake, etc.) that generates a longitudinal force of a tire on each wheel is used to control the longitudinal force, roll, pitch, and yaw of the vehicle of the center of gravity six-component has been described. However, the present disclosure is not limited thereto. The vehicle control actuator group 4 may include all of the drive actuator 41, the brake actuator 42, the front wheel steering actuator 43, the rear wheel steering actuator 44, the active stabilizer 45, and the active suspension 46, any combination of them, or any one of them. Further, all, any combination, or any one in the center of gravity six-component may be controlled. Further, the tire acting force generated in each wheel may be all, any combination, or any one in the tire three-component.

In the above embodiment, when it is estimated that the application state changes when the constraint that was valid in any of the wheels is invalidated, the tire three-component calculation unit 13 does not necessarily have to initialize the stored application state. When the stored application state of the constraint is not initialized, the tire three-component calculation unit does not have to estimate whether or not the application state changes in each wheel.

In the above embodiment, as an example, the evaluation function in the calculation of the optimum solution is the sum of squares of the error from the target value of the center of gravity six-component, but the present disclosure is not limited thereto. As the evaluation function, for example, in addition to the sum of squares of the error from the target value of the center of gravity six-component, the sum of squares of the error from the target value of the tire three-component of each wheel may be added. In addition, the weight may be considered for the vehicle six-component and the tire three-component of each wheel. In this case, in addition to changing the coefficient matrix so that the weight is added, the evaluation function may be changed so that the weight matrix can be added.

What is claimed is:

1. A vehicle control apparatus that performs vehicle control by a vehicle control actuator group based on a driver input or a vehicle motion control request, the vehicle control apparatus comprising:
a center of gravity six-component calculation unit configured to calculate a center of gravity six-component including a plane three-component and a three-component on spring as vehicle motion targets based on the driver input or the vehicle motion control request;
a tire three-component calculation unit configured to calculate a tire three-component of each wheel for two or more wheels of a vehicle from the center of gravity six-component by calculation of a quadratic programming method using an active-set method; and
a vehicle control unit configured to perform vehicle control by the vehicle control actuator group based on the tire three-component of each wheel, wherein
in the active-set method, a constraint expressed as an inequality corresponding to upper and lower limits of the tire three-component according to characteristics of the vehicle control actuator group or characteristics of each wheel is imposed on each wheel, and
the tire three-component calculation unit is configured to:
apply the constraint based on a determination result of determining whether the constraint is valid or invalid for each of the wheels based on a predetermined optimum condition for obtaining an optimum solution under the constraint expressed by the inequality, and calculate an optimum solution of the tire three-component of each wheel by performing a tentative optimum solution calculation one or more times until the predetermined optimum condition is satisfied; and store an application state of the constraint when the optimum solution satisfying the predetermined optimum condition is obtained, and calculate the optimum solution of the tire three-component of each wheel by using a stored value of the application state of the constraint, in next calculation of the optimum solution.

2. The vehicle control apparatus according to claim 1, wherein the tire three-component calculation unit is configured to:

estimate whether or not the application state of the constraint changes in each wheel; and initialize the stored application state of the constraint when it is estimated that the application state changes when the constraint that was valid is invalidated in any of the wheels.

* * * * *